(12) United States Patent
Ellefson

(10) Patent No.: US 6,652,182 B1
(45) Date of Patent: Nov. 25, 2003

(54) PORTABLE HANDICAPPED PARKING BARRIER

(76) Inventor: Scott Ellefson, 6423 Temple Drive NE, Calgary Alberta Province (CA), T1Y 3R8

(*) Notice: Subject to any disclaimer, the term of this patent is extended or adjusted under 35 U.S.C. 154(b) by 0 days.

(21) Appl. No.: 10/281,367

(22) Filed: Oct. 26, 2002

(51) Int. Cl.[7] .................................................. E01F 9/00
(52) U.S. Cl. ........................................ 404/9; 116/28 R
(58) Field of Search ............................ 116/63 P, 28 R; 180/271, 289, 287; 49/34, 49, 380; 404/9, 6

(56) References Cited

U.S. PATENT DOCUMENTS

| | | | | |
|---|---|---|---|---|
| 1,834,557 A | * | 12/1931 | Van Duyn | 116/52 |
| 2,006,654 A | * | 7/1935 | Roan | 116/54 |
| 2,144,813 A | * | 1/1939 | Roan et al. | 340/487 |
| 2,252,529 A | * | 8/1941 | Simpkins et al. | 116/39 |
| 2,384,689 A | * | 9/1945 | Moore | 340/470 |
| 3,153,398 A | * | 10/1964 | Runkle et al. | 116/28 R |
| 3,236,552 A | * | 2/1966 | Percifull | 293/9 |
| 3,788,268 A | * | 1/1974 | Hiatt et al. | 116/28 R |
| 4,137,662 A | | 2/1979 | Baumer | 40/612 |
| 4,325,318 A | * | 4/1982 | Kitrell | 116/28 R |
| 4,559,518 A | * | 12/1985 | Latta, Jr. | 340/433 |
| 4,565,152 A | * | 1/1986 | Bennett | 116/50 |
| 4,697,541 A | * | 10/1987 | Wicker | 116/28 R |
| 4,825,192 A | * | 4/1989 | Wells | 340/433 |
| 4,852,511 A | | 8/1989 | Look et al. | 116/63 P |
| 4,956,630 A | * | 9/1990 | Wicker | 340/433 |
| 5,226,686 A | * | 7/1993 | Triggs et al. | 293/117 |
| 5,249,381 A | * | 10/1993 | Panossian | 40/591 |
| 5,281,948 A | * | 1/1994 | Estrada | 340/433 |
| 5,355,117 A | * | 10/1994 | Jefferson | 340/425.5 |
| 5,406,251 A | * | 4/1995 | Leis | 340/433 |
| 5,458,434 A | | 10/1995 | Bent et al. | 404/6 |
| 5,474,017 A | | 12/1995 | Mohebbi et al. | 116/209 |
| 5,635,902 A | * | 6/1997 | Hochstein | 340/433 |
| 5,781,120 A | * | 7/1998 | Kucik | 340/425.5 |
| 5,847,642 A | * | 12/1998 | Esposito et al. | 340/433 |
| 5,860,385 A | * | 1/1999 | Lamparter | 116/28 R |
| 6,213,047 B1 | * | 4/2001 | Means et al. | 116/28 R |
| 6,267,332 B1 | * | 7/2001 | Almblad | 246/294 |
| 6,477,978 B2 | * | 11/2002 | Lamparter | 116/28 R |

* cited by examiner

Primary Examiner—Robert E. Pezzuto
Assistant Examiner—Kristine Florio
(74) Attorney, Agent, or Firm—Sturm & Fix LLP

(57) ABSTRACT

A handicapped parking barrier (10) adapted for installation in the vicinity of the rear bumper (101), a wheelchair lift equipped vehicle (100) wherein the parking barrier (10) includes a telescoping boom member (20) mounted on top of a vertical extension member (30) including at least one linkage arm (31) pivotally connected on its opposite ends to both the inboard boom segment (21) of the telescoping boom member (20) and the floor panel (45) of a housing member (40) that is attached to the rear bumper (101) of the vehicle (100).

12 Claims, 2 Drawing Sheets

PORTABLE HANDICAPPED PARKING BARRIER

CROSS REFERENCE TO RELATED APPLICATIONS

Not applicable.

BACKGROUND OF THE INVENTION

1. Field of the Invention

The present invention relates to the field of mechanized traffic barrier devices in general and in particular to an articulated extensible handicapped parking barrier that is mounted on the bumper of a wheelchair lift equipped vehicle.

2. Description of Related Art

As can be seen by reference to the following U.S. Pat. Nos. 5,458,434; 4,137,662; 5,474,017; and, 4,852,511, the prior art is replete with myriad and diverse mechanized barriers used to control traffic and the like.

While all of the aforementioned prior art constructions are more than adequate for the basic purpose and function for which they have been specifically designed, they are uniformly deficient with respect to their failure to provide a simple, efficient, and practical vehicle mounted handicapped access parking barrier that is both vertically and horizontally extensible to control the access into parking spaces adjacent to a wheelchair lift equipped vehicle.

As most operators of wheelchair lift equipped vehicles are all too well aware, the normal spacing between adjacent parking slots are two close together to allow the deployment of the wheelchair lift when another vehicle is parked adjacent to the location of the lift.

As a consequence of this situation, it is now necessary for the operator of the lift equipped vehicle to back the vehicle out of the parking slot and into the normal travel lanes in order to deploy the lift both delaying other drivers and unnecessarily exposing the occupant of the wheelchair to danger.

Therefore, as a consequence of the foregoing situation, there has existed a longstanding need for a new and improved vehicle mounted handicapped parking barrier that can be actuated by handicapped individuals wherein the barrier extends horizontally and raised vertically to warn others of the presence of a wheelchair lift equipped vehicle; and, the provision of such a device is the stated objective of the present invention.

BRIEF SUMMARY OF THE INVENTION

Briefly stated, the handicapped parking barrier that forms the basis of the present invention comprises in general a boom unit, a vertical extension unit, and a housing unit that is adapted to be secured in the vicinity of the bumper of a wheelchair lift equipped vehicle.

As will be explained in greater detail further on in the specification, the portable parking barrier of this invention is designed to prevent other vehicles from parking too close to the vehicle used by a person in a wheelchair. The barrier mounts on or in the vicinity of the vehicle's bumper and may be deployed once parked. This barrier is extremely useful especially when the disabled person's vehicle is equipped with a wheelchair lift. Once the barrier is deployed, enough room is blocked off for the lift to be deployed for entry. This allows the user to leave their vehicle with confidence that they will be able to enter when they return. The barrier is lightweight and spring assisted for easy deployment and storage, even for people with limited strength and movement. The barrier arm sections telescope easily in and out when pulled by a nylon strap. When in the storage position, the barrier is contained in a latched housing member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
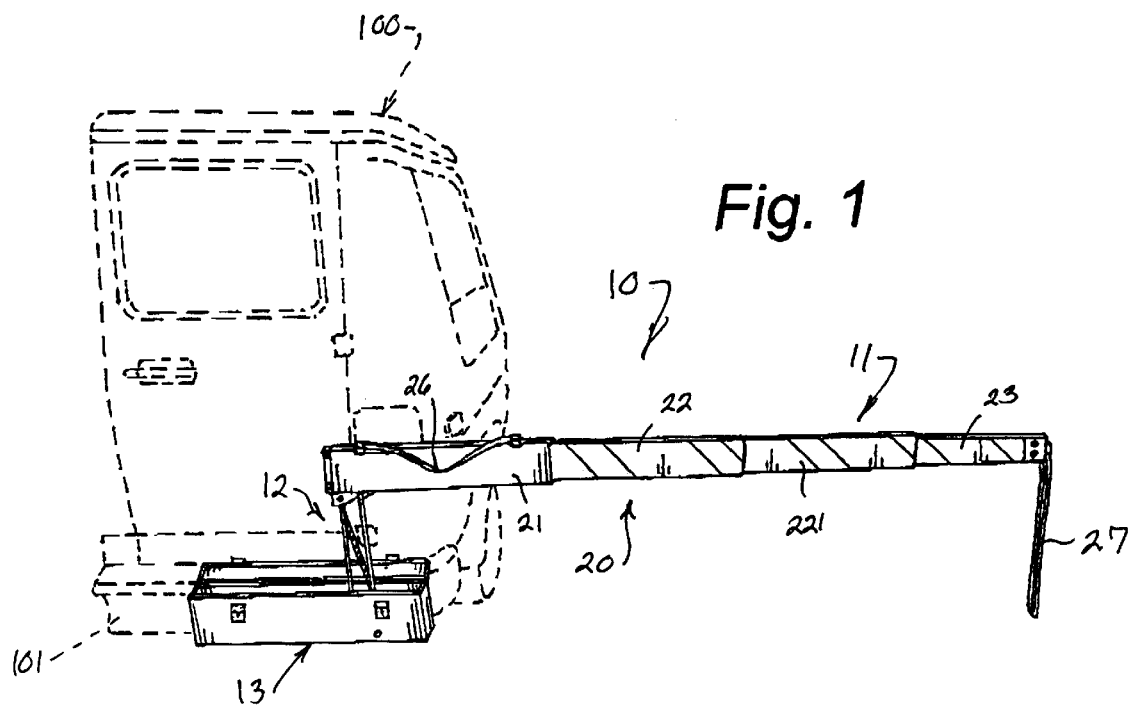
FIG. 1 is a perspective view of the parking barrier in its fully extended mode of deployment.

As can be seen by reference to the drawings, and in particular to FIG. 1, the handicapped parking barrier that forms the basis of the present invention is designated generally by the reference number 10. The parking barrier 10 comprises a boom unit 11, a vertical extension unit 12, and a housing unit 13 that is adapted to be mounted in the vicinity of the rear bumper 10 of a wheelchair lift equipped vehicle 100.

Figure 3:
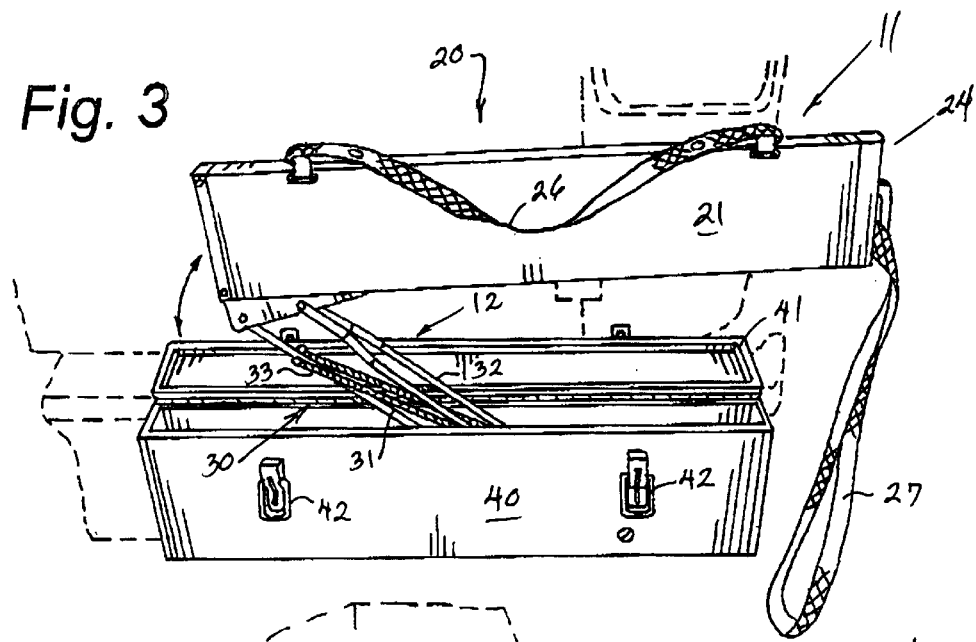
FIG. 3 is a perspective view of the parking barrier in its partially raised and telescoping collapsed mode of deployment; and, FIG. 4 is a perspective view of the parking barrier in its vertically raised and partially extended mode of deployment.
Figure 4:
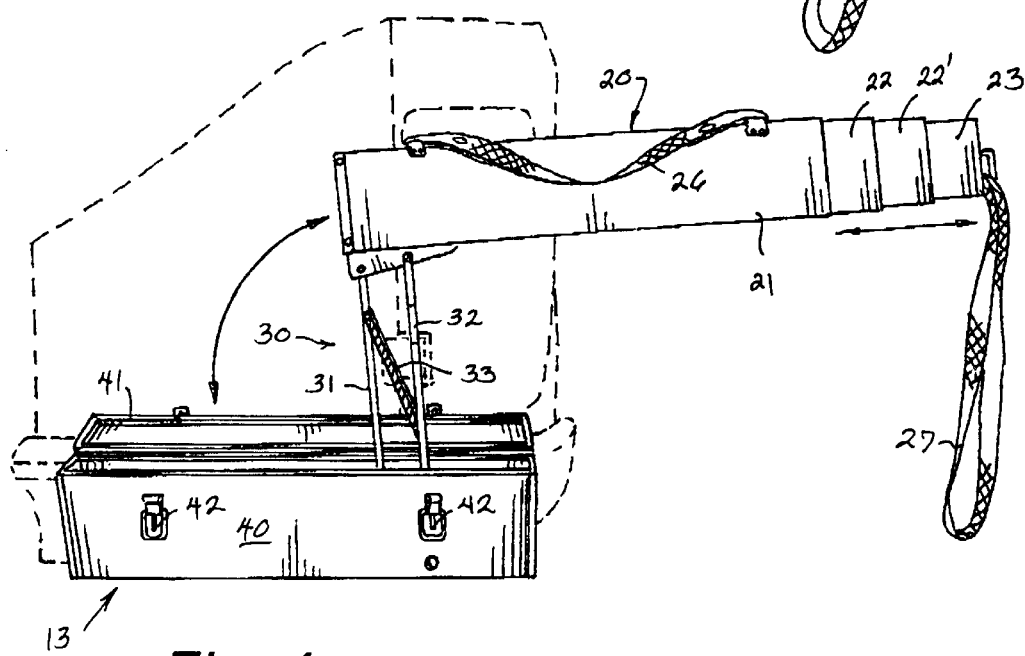

As shown in FIGS. 1, 3, and 4, the boom unit 11 comprises a horizontally extensible boom member 20 which includes a plurality of telescoping boom segments 21 22 23 etc., wherein, the smallest boom segment 23 is disposed on the distal end 24 of the boom member 20 and, wherein the largest boom segment 21 is fixedly secured to and supported by the vertical extension unit 12.

As can also be appreciated by reference to FIGS. 3 and 4, the vertical extension unit 12 comprises a vertical lift member 30 having a plurality of linkage arms 31 32 pivotally secured to the boom unit 11 and the housing unit 13 and provided with one or more spring bearing elements 33 for biasing the linkage arms 31 32 into a vertically upright position.

Figure 2:
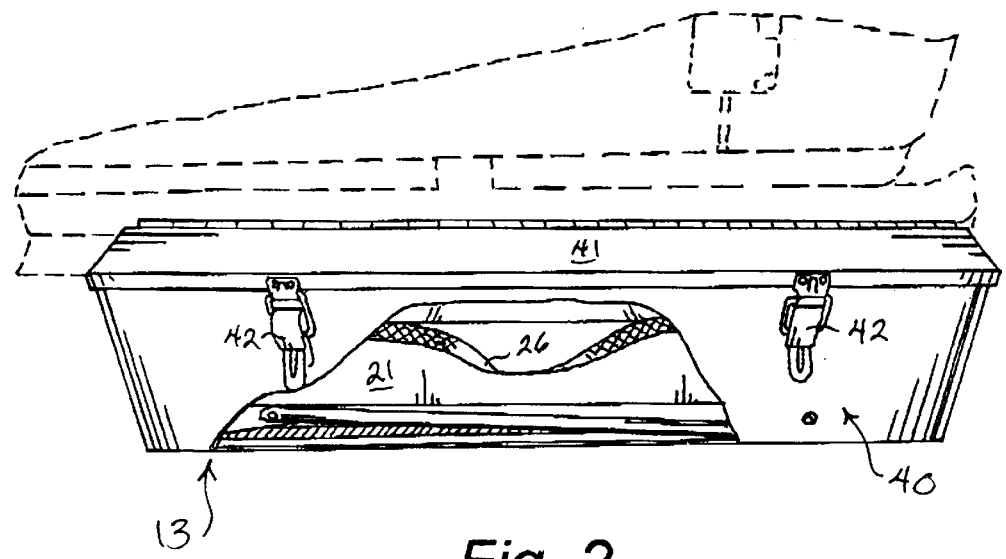
FIG. 2 is a perspective view of the parking barrier in its stowed mode of deployment.

Turning now to FIGS. 2 through 4, it can be seen that the housing unit 13 comprises an elongated housing member 40 the interior dimensions of which are slightly greater than the exterior dimensions of the largest boom segment 21; and, wherein the housing member 40 is provided with a hinged element 41 and a plurality of latch elements 42.

At this juncture, it should be noted that the telescoping segments 21 22 23 of the boom member 20 have an elongated narrow rectangular configuration which is required to provide the necessary visibility to the boom member 20 and which is preferably provided with bright visible color, reflective areas and a printed legend in bold letters explaining the purpose and function of the handicapped parking barrier 10.

In addition, as shown in FIGS. 1 through 4, the proximal boom segment 21 is provided with a lifting handle 26 and the distal boom segment 23 is provided with a strap element 27 that facilitates the extension of the boom member 20 in a well recognized fashion.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A portable handicapped parking barrier adapted for use with a wheelchair lift equipped vehicle having a bumper wherein the parking barrier comprises in general a boom unit including a telescoping boom member having a proximal end and a distal end a vertical extension unit for raising and lowering the proximal and distal ends of the telescoping boom member; and, a housing unit including a housing member connected to the vertical extension unit and dimensioned to receive both the boom unit and the vertical extension unit wherein the housing member is adapted to be mounted in the vicinity of the bumper of the wheelchair lift equipped vehicle.

2. The parking barrier as in claim 1; wherein, the vertical extension unit includes at least one linkage arm pivotally yet fixedly secured on one end to a portion of the housing member and pivotally yet fixedly secured to a portion of the boom member.

3. The parking barrier as in claim 1; wherein, said boom member includes a plurality of boom segments including at least a proximal boom segment and a distal boom segment.

4. The parking barrier as in claim 2; wherein, said boom member includes a plurality of boom segments including at least a proximal boom segment and a distal boom segment.

5. The parking barrier as in claim 4; wherein, the at least one linkage arm is secured on one end on the proximal end of the proximal boom segment.

6. The parking boom as in claim 5; wherein, the housing member includes a plurality of sidewalls extending upwardly from a floor panel.

7. The parking barrier as in claim 6; wherein, the floor panel has a proximal end and a distal end wherein the at least one linkage arm is secured on the other end of the distal end of the floor panel.

8. The parking barrier as in claim 7; wherein, the at least one linkage arm is further provided with a spring element biasing the at least one linkage arm away from the floor panel.

9. The parking barrier as in claim 8; wherein, the housing member is further provided with a catch element adapted to releasably engage the at least one linkage arm when the linkage arm is disposed in the upright position.

10. The parking barrier as in claim 9; wherein, the boom segments have a generally elongated rectangular configuration.

11. The parking barrier as in claim 10; wherein, the housing member has a lid element hingedly connected to one of the sidewalls.

12. The parking barrier as in claim 11; wherein, the lid element is further provided with a latch element adapted to releasably engage a portion of an opposed sidewall.

\* \* \* \* \*